(12) United States Patent
Yokobori et al.

(10) Patent No.: US 7,024,455 B2
(45) Date of Patent: Apr. 4, 2006

(54) NETWORK COMMUNITY SUPPORTING METHOD AND SYSTEM

(75) Inventors: Yasuko Yokobori, Kawasaki (JP); Yumiko Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 656 days.

(21) Appl. No.: 09/818,503

(22) Filed: Mar. 28, 2001

(65) Prior Publication Data
US 2001/0029501 A1  Oct. 11, 2001

(30) Foreign Application Priority Data
Mar. 31, 2000  (JP) .............................. 2000-099377

(51) Int. Cl.
*G06F 15/16* (2006.01)
(52) U.S. Cl. ...................................... 709/204; 709/203
(58) Field of Classification Search ................ 709/221, 709/224, 206, 203, 204; 707/201, 1, 3, 4, 707/203, 104; 705/40; 725/60; 715/514, 715/753; 379/230; 370/352
See application file for complete search history.

(56) References Cited

U.S. PATENT DOCUMENTS

| | | | | |
|---|---|---|---|---|
| 5,257,366 A | * | 10/1993 | Adair et al. .................... 707/4 |
| 5,469,206 A | * | 11/1995 | Strubbe et al. ................ 725/60 |
| 5,519,865 A | * | 5/1996 | Kondo et al. ................... 707/1 |
| 5,634,016 A | * | 5/1997 | Steadham et al. .......... 715/753 |
| 5,812,639 A | * | 9/1998 | Bartholomew et al. ..... 370/352 |
| 5,819,291 A | * | 10/1998 | Haimowitz et al. .......... 707/201 |
| 5,835,911 A | * | 11/1998 | Nakagawa et al. .......... 707/203 |
| 5,940,492 A | * | 8/1999 | Galloway et al. ........... 379/230 |
| 5,940,821 A | * | 8/1999 | Wical .............................. 707/3 |
| 5,983,246 A | * | 11/1999 | Takano ........................ 715/514 |
| 6,240,401 B1 | * | 5/2001 | Oren et al. .................... 705/40 |
| 6,493,703 B1 | * | 12/2002 | Knight et al. ................... 707/3 |
| 6,718,367 B1 | * | 4/2004 | Ayyadurai ................... 709/206 |
| 6,757,691 B1 | * | 6/2004 | Welsh et al. ............. 707/104.1 |
| 2002/0091758 A1 | * | 7/2002 | Singh et al. ................. 709/203 |

OTHER PUBLICATIONS

Case-Based Learning: Beyond Classification of Feature Vectors—Aha, Wettschereck (1997) ; www.aic.nrl.navy.mil/papers/1997/AIC-97-002.ps.Z.*

Trip Report—Dynamic Database Panel II—Meeting #2 Notes; www.objs.com/ddb/9704-Dynamic-Database-II-Meeting-2-Notes.htm.*

CHI 97: Building Task-Specific Interfaces to High Volume Conversational Data; www.acm.org/sigchi/chi97/proceedings/paper/lgt.htm.*

(Continued)

*Primary Examiner*—Thong Vu
(74) *Attorney, Agent, or Firm*—Staas & Halsey LLP

(57) ABSTRACT

A message database stores contents of a series of messages given by participants of a network community together with titles thereof. A theme updating part changes appropriately a theme for drawing real intention, such as characteristics, lifestyles, subconscious needs or the like, of a user class of products/services. A part analyzes the contents of messages of the participants of the network community and draws the real intention of the user class of the products/services.

12 Claims, 16 Drawing Sheets

OTHER PUBLICATIONS

A Comparative Study of Inductive Logic Programming Methods . . . —Cohen, Devanbu (1997) www.research.att.com/~prem/ml97.ps.*

A Sequential Sampling Algorithm for a—General Class Of (2000) www.informatik.hu-berlin.de/~scheffer/publications/kdd2000.ps.*

Classifying Materials from their Reflectance—Properties Peter Nillius www.nada.kth.se/~nillius/publications/nillius_class_mat.pdf.*

Integrating Heterogeneous Databases: An Overview—Hepner (1995) ftp.cm.deakin.edu.au/pub/TR/Computing/TR-C95-30.ps.gz.*

Video Mail Retrieval: The Effect of Word Spotting . . . — Jones, Foote, Jones . . . (1995) www.fxpal.com/people/foote/papers/icassp95.pdf.*

Automatic Message Indexing and Full Text Retrieval for a . . . —Langer, Hickey acl.ldc.upenn.edu/W/W97/W97-0502.pdf.*

Extensibility in a Visual Language for Web-based . . . — Steven Tanimoto Carlo (1998) ftp.cs.washington.edu/tr/1998/03/UW-CSE-98-03-01.PS.Z.*

Implementing Highly-Available WWW Servers based on . . . —Baldoni, Bonamoneta, . . . (1998) www.dis.uniroma1.it/~marchet/docs/isorc99.pdf.*

* cited by examiner

[ FLAG : ADD, CHANGE, DELETE, ETC. ]

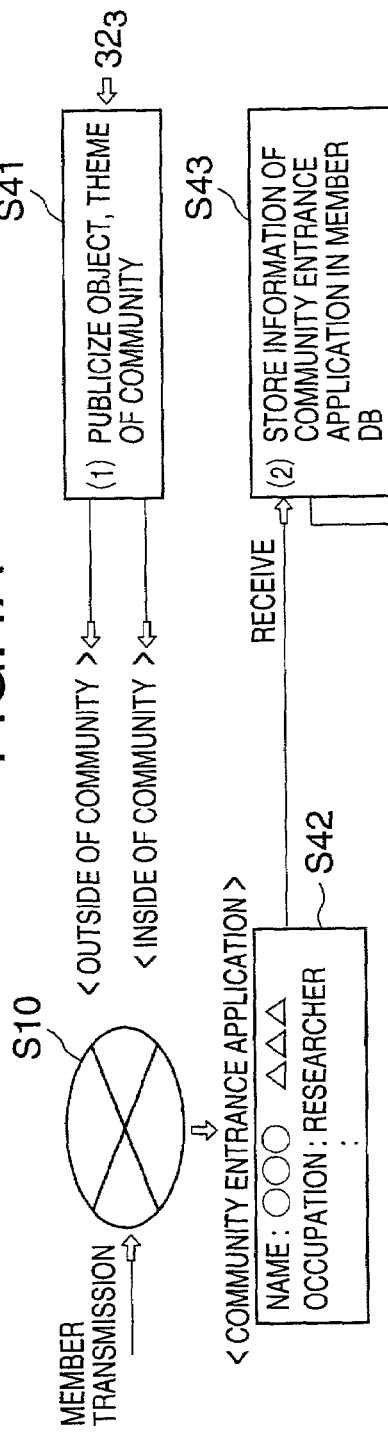
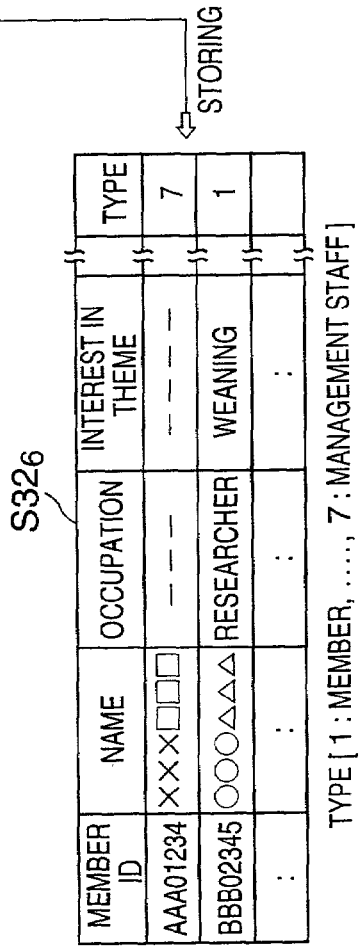
FIG.4A
FIG.4B

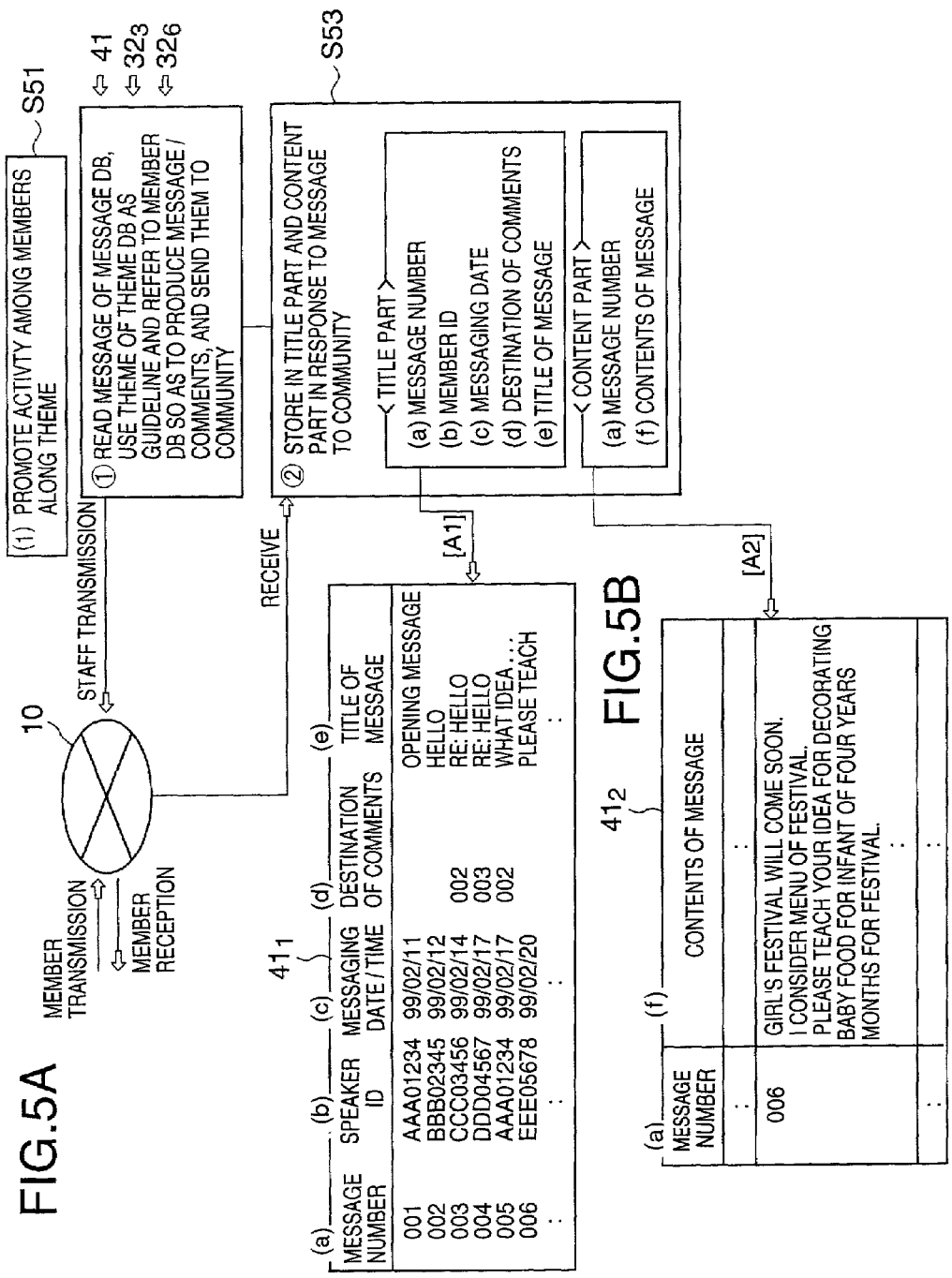

| GROUP ID | MESSAGE NUMBER | MEMBER ID | MESSAGING DATE | ORIGINAL TITLE PART | | ANALYSIS TITLE PART | | THEME PART |
|---|---|---|---|---|---|---|---|---|
| | | | | DESTINATION OF COMMENTS | TITLE OF MESSAGE | DESTINATION OF COMMENTS | TITLE OF MESSAGE | THEME ID |
| | 001 | AAA01234 | 99/01/01 | 000 | OPENING MESSAGE | | | |
| | 002 | BBB02345 | 99/01/02 | 000 | HELLO | | | |
| | 003 | CCC03456 | 99/01/04 | 002 | RE: HELLO | | | |
| | 004 | DDD04567 | 99/01/07 | 002 | RE: HELLO | | | |
| | 005 | AAA01234 | 99/01/07 | 003 | WHAT IDEA? | | | |
| | 006 | EEE05678 | 99/02/20 | 000 | PLEASE TEACH | | | |
| | 007 | FFF06789 | 99/03/01 | 000 | HI | | | |
| | 008 | BBB02345 | 99/03/04 | 000 | SOON WEANING | | | |

| GROUP ID | MESSAGE NUMBER | MEMBER ID | MESSAGING DATE | ORIGINAL TITLE PART | | ANALYSIS TITLE PART | | THEME PART |
|---|---|---|---|---|---|---|---|---|
| | | | | DESTINATION OF COMMENTS | TITLE OF MESSAGE | DESTINATION OF COMMENTS | TITLE OF MESSAGE | THEME ID |
| 001 | 001 | AAA01234 | 99/02/11 | 000 | OPENING MESSAGE | | | |
| 002 | 002 | BBB02345 | 99/02/12 | 000 | HELLO | | | |
| 002 | 003 | CCC03456 | 99/02/14 | 002 | RE: HELLO | | | |
| 002 | 005 | AAA01234 | 99/02/17 | 003 | WHAT IDEA? | | | |
| 002 | 004 | DDD04567 | 99/02/17 | 002 | RE: HELLO | | | |
| 003 | 006 | EEE05678 | 99/02/20 | 000 | PLEASE TEACH | | | |
| 004 | 007 | FFF06789 | 99/03/01 | 000 | HI | | | |
| 005 | 008 | BBB02345 | 99/03/04 | 000 | SOON WEANING | | | |

| GROUP ID | MESSAGE NUMBER | MEMBER ID | MESSAGING DATE | ORIGINAL TITLE PART | | ANALYSIS TITLE PART | | THEME PART |
|---|---|---|---|---|---|---|---|---|
| | | | | DESTINATION OF COMMENTS | TITLE OF MESSAGE | DESTINATION OF COMMENTS | TITLE OF MESSAGE | THEME ID |
| 001 | 001 | AAA01234 | 99/02/11 | 000 | OPENING MESSAGE | 000 | OPENING MESSAGE | |
| 002 | 002-1 | BBB02345 | 99/02/12 | 000 | HELLO | 000 | IMMEDIATE BEFORE START OF BABY FOOD | |
| 002 | 002-2 | BBB02345 | 99/02/12 | 000 | HELLO | 000 | RELATION WITH MILK | |
| 002 | 003 | CCC03456 | 99/02/14 | 002 | RE: HELLO | 002 | HOW TO MAKE JUICE | |
| 002 | 005 | AAA01234 | 99/02/17 | 003 | WHAT IDEA? | 003 | WHAT IDEA? | |
| 002 | 004 | DDD04567 | 99/02/17 | 002 | RE: HELLO | 002 | HOW TO FEED JUICE AND MILK | |
| 003 | 006 | EEE05678 | 99/02/20 | 000 | PLEASE TEACH | 000 | MENU FOR GIRL'S FESTIVAL | |
| 004 | 007 | FFF06789 | 99/03/01 | 000 | HI | 000 | MENU FOR GIRL'S FESTIVAL FOR BABY | |
| 005 | 008 | BBB02345 | 99/03/04 | 000 | SOON WEANING | 000 | SHIFT TO FOLLOW-UP MILK | |

FIG.8A $32_4$

| GROUP ID | MESSAGE NUMBER | MEMBER ID | MESSAGING DATE | ORIGINAL TITLE PART | | ANALYSIS TITLE PART | | THEME PART |
|---|---|---|---|---|---|---|---|---|
| | | | | DESTINATION OF COMMENTS | TITLE OF MESSAGE | DESTINATION OF COMMENTS | TITLE OF MESSAGE | THEME ID |
| 001 | 001 | AAA01234 | 99/02/11 | 000 | OPENING MESSAGE | 000 | OPENING MESSAGE | |
| 002 | 002-1 | BBB02345 | 99/02/12 | 000 | HELLO | 000 | IMMEDIATE BEFORE START OF BABY FOOD | |
| 002 | 002-2 | BBB02345 | 99/02/12 | 000 | HELLO | 000 | RELATION WITH MILK | |
| 002 | 003 | CCC03456 | 99/02/14 | 002 | RE: HELLO | 002-1 | HOW TO MAKE JUICE | |
| 002 | 005 | AAA01234 | 99/02/17 | 003 | WHAT IDEA ? | 003 | WHAT IDEA ? | |
| 002 | 004 | DDD04567 | 99/02/17 | 002 | RE: HELLO | 002-2 | HOW TO FEED JUICE AND MILK | |
| 003 | 006 | EEE05678 | 99/02/20 | 000 | PLEASE TEACH | 000 | MENU FOR GIRL'S FESTIVAL | |
| 004 | 007 | FFF06789 | 99/03/01 | 000 | HI | 006 | MENU FOR GIRL'S FESTIVAL FOR BABY | |
| 005 | 008 | BBB02345 | 99/03/04 | 000 | SOON WEANING | 000 | SHIFT TO FOLLOW-UP MILK | |
| : | : | : | : | : | : | : | : | |

FIG.8B $32_4$

| GROUP ID | MESSAGE NUMBER | MEMBER ID | MESSAGING DATE | ORIGINAL TITLE PART | | ANALYSIS TITLE PART | | THEME PART |
|---|---|---|---|---|---|---|---|---|
| | | | | DESTINATION OF COMMENTS | TITLE OF MESSAGE | DESTINATION OF COMMENTS | TITLE OF MESSAGE | THEME ID |
| 001 | 001 | AAA01234 | 99/02/11 | 000 | OPENING MESSAGE | 000 | OPENING MESSAGE | |
| 002 | 002-1 | BBB02345 | 99/02/12 | 000 | HELLO | 000 | IMMEDIATE BEFORE START OF BABY FOOD | |
| 002 | 003 | CCC03456 | 99/02/14 | 002 | RE: HELLO | 002-1 | HOW TO MAKE JUICE | |
| 002 | 005 | AAA01234 | 99/02/17 | 003 | WHAT IDEA ? | 003 | WHAT IDEA ? | |
| 003 | 002-2 | BBB02345 | 99/02/12 | 000 | HELLO | 000 | RELATION WITH MILK | |
| 003 | 004 | DDD04567 | 99/02/17 | 002 | RE: HELLO | 002-2 | HOW TO FEED JUICE AND MILK | |
| 004 | 006 | EEE05678 | 99/02/20 | 000 | PLEASE TEACH | 000 | MENU FOR GIRL'S FESTIVAL | |
| 004 | 007 | FFF06789 | 99/03/01 | 0 | HI | 006 | MENU FOR GIRL'S FESTIVAL FOR BABY | |
| 005 | 008 | BBB02345 | 99/03/04 | 000 | SOON WEANING | 000 | SHIFT TO FOLLOW-UP MILK | |
| : | : | : | : | : | : | : | : | |

FIG.9A

| THEME PART | | | FLAG | KEYWORD PART | | |
|---|---|---|---|---|---|---|
| THEME ID | LEVEL - 1 | LEVEL - 2 | | MAIN KEYWORD | NOT- KEYWORD | AND- KEYWORD |
| 010-10 | PREPARE ACTIVITY | OBJECT AND THEME | | OPENING MESSAGE | | |
| 010-20 | PREPARE ACTIVITY | NETWORK ACTIVITY PRESENTATION | | ACTIVITY PRESENTATION | | |
| : | PREPARE ACTIVITY | : | | : | | |
| 020-10 | MILK | MILK | | MILK | | |
| 030-10 | BABY FOOD | EARLY WEANING | | WEANING | | START |
| : | BABY FOOD | : | | : | | |
| 040-10 | DRINK | JUICE | | JUICE | | |
| : | DRINK | : | | : | | |

FIG.9B

| GROUP ID | MESSAGE NUMBER | ... | ORIGINAL TITLE PART | ANALYSIS TITLE PART | THEME PART | |
|---|---|---|---|---|---|---|
| | | | | TITLE OF MESSAGE | THEME ID | THEME ID |
| 001 | 001 | | | OPENING MESSAGE | 010-10 | |
| 002 | 002-1 | | | IMMEDIATE BEFORE START OF BABY FOOD | 030-10 | |
| 002 | 003 | | | HOW TO MAKE JUICE | 040-10 | |
| 002 | 005 | | | WHAT IDEA ? | | |
| 003 | 002-2 | | | RELATION WITH MILK | 020-10 | |
| 003 | 004 | | | HOW TO FEED JUICE AND MILK | 040-10 | 020-10 |
| 004 | 006 | | | MENU FOR GIRL'S FESTIVAL | | |
| 004 | 007 | | | MENU FOR GIRL'S FESTIVAL FOR BABY | | |
| 005 | 008 | | | SHIFT TO FOLLOW-UP MILK | 020-10 | |
| : | : | | | : | | |

FIG.11A

| THEME PART ||| FLAG | KEYWORD PART |||
| --- | --- | --- | --- | --- | --- | --- |
| THEME ID | LEVEL - 1 | LEVEL - 2 | | MAIN KEYWORD | NOT- KEYWORD | AND- KEYWORD |
| : | : | : | : | : | : | : |
| 020-10 | MILK | POWDERED MILK | MODIFIED | MILK | FOLLOW | |
| 020-20 | MILK | MOTHER'S MILK | ADDED | MOTHER'S MILK | | |
| 020-30 | MILK | FOLLOW- UP MILK | ADDED | MILK | | FOLLOW |
| : | : | : | : | : | : | : |
| 110-10 | EVENT FOOD | GIRL'S FESTIVAL | ADDED | GIRL'S FESTIVAL | | |
| : | : | : | : | : | : | : |

FIG.11B

| GROUP ID | MESSAGE NUMBER | ... | ORIGINAL TITLE PART | ANALYSIS TITLE PART<br>TITLE OF MESSAGE | THEME PART |||
| --- | --- | --- | --- | --- | --- | --- | --- |
| | | | | | THEME ID | THEME ID | |
| : | : | | | : | | | |
| 003 | 002-2 | | | RELATION WITH MILK | 020-10 | | |
| 003 | 004 | | | HOW TO FEED JUICE AND MILK | 040-10 | 020-10 | |
| 004 | 006 | | | MENU FOR GIRL'S FESTIVAL | 110-10 | | |
| 004 | 007 | | | MENU FOR GIRL'S FESTIVAL FOR BABY | 110-10 | | |
| 005 | 008 | | | SHIFT TO FOLLOW-UP MILK | 020-30 | | |
| : | : | | | : | | | |

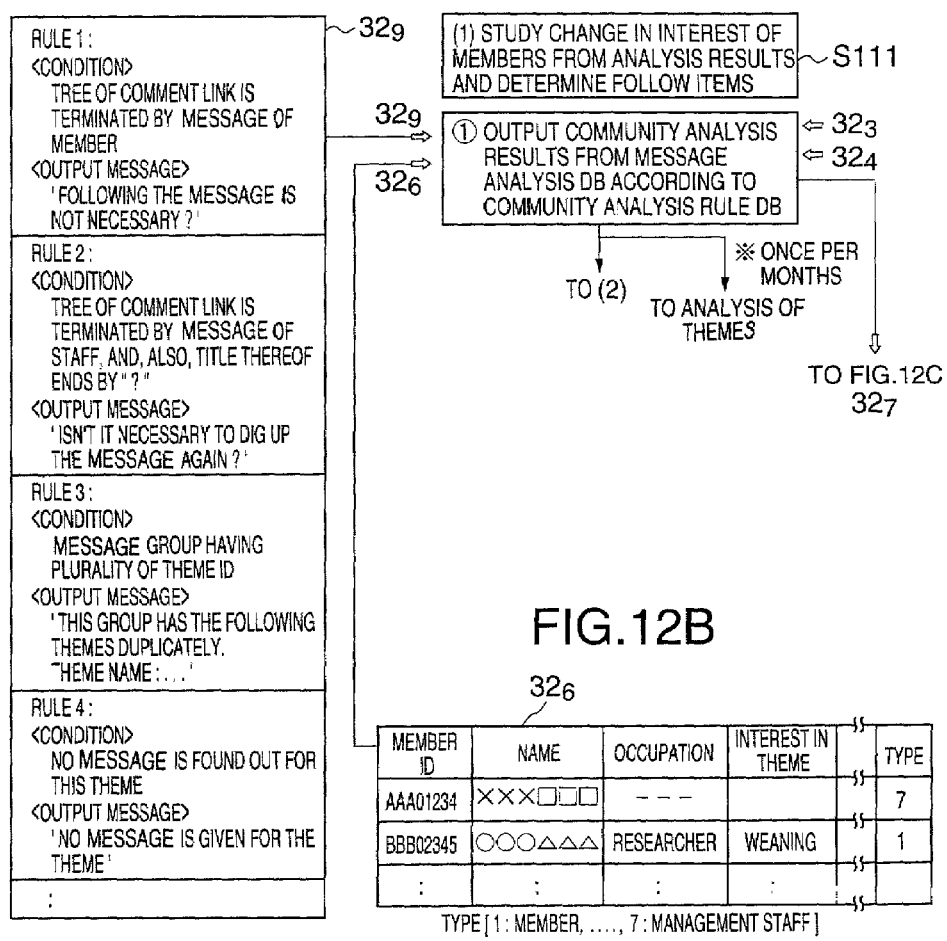

| BY-THEME MESSAGE LIST | FOLLOW-INSTRUCTION MESSAGE |
|---|---|
| [ PREPARE ACTIVITY ]<br>〈 OBJECT AND THEME 〉<br>  001    OPENING MESSAGE<br>     ⋮<br><br>[ MILK ]<br>〈 POWDERED MILK 〉<br>  002-1  RELATION WITH MILK<br>  004    HOW TO FEED JUICE<br>          AND MILK<br>     ⋮ | RULE 3 : THIS GROUP HAS FOLLOWING THEME DUPLICATELY.<br>THEME NAME: ' JUICE ' |
| 〈 MOTHER'S MILK 〉 | RULE 4 : NO MESSAGE IS GIVEN FOR THIS THEME |
| 〈 FOLLOW- UP MILK 〉<br>  008    SHIFT TO FOLLOW- UP MILK<br>     ⋮<br><br>[ BABY FOOD ]<br>〈 EARLY WEANING 〉<br>  002    IMMEDIATELY BEFORE<br>          START OF BABY FOOD<br>  003    HOW TO MAKE JUICE<br>  005    WHAT IDEA ?<br>     ⋮ | RULE 2 : ISN'T IT NECESSARY TO DIG UP THE MESSAGE AGAIN ? |
| [ DRINK ]<br>〈 JUICE 〉<br>  002-1  RELATION WITH MILK<br>  004    HOW TO FEED JUICE<br>          AND MILK<br>     ⋮ | RULE 3 : THIS GROUP HAS THE FOLLOWING THEME DUPLICATELY.<br>THEME NAME : ' MILK ' |
| [ EVENT FOOD ]<br>〈 GIRL'S FESTIVAL 〉<br>  006    MENU FOR GIRL'S FESTIVAL<br>  007    MENU FOR GIRL'S FESTIVAL<br>          FOR BABY<br>     ⋮ | RULE 1 : FOLLOWING THE MESSAGE IS NOT NECESSARY ? |

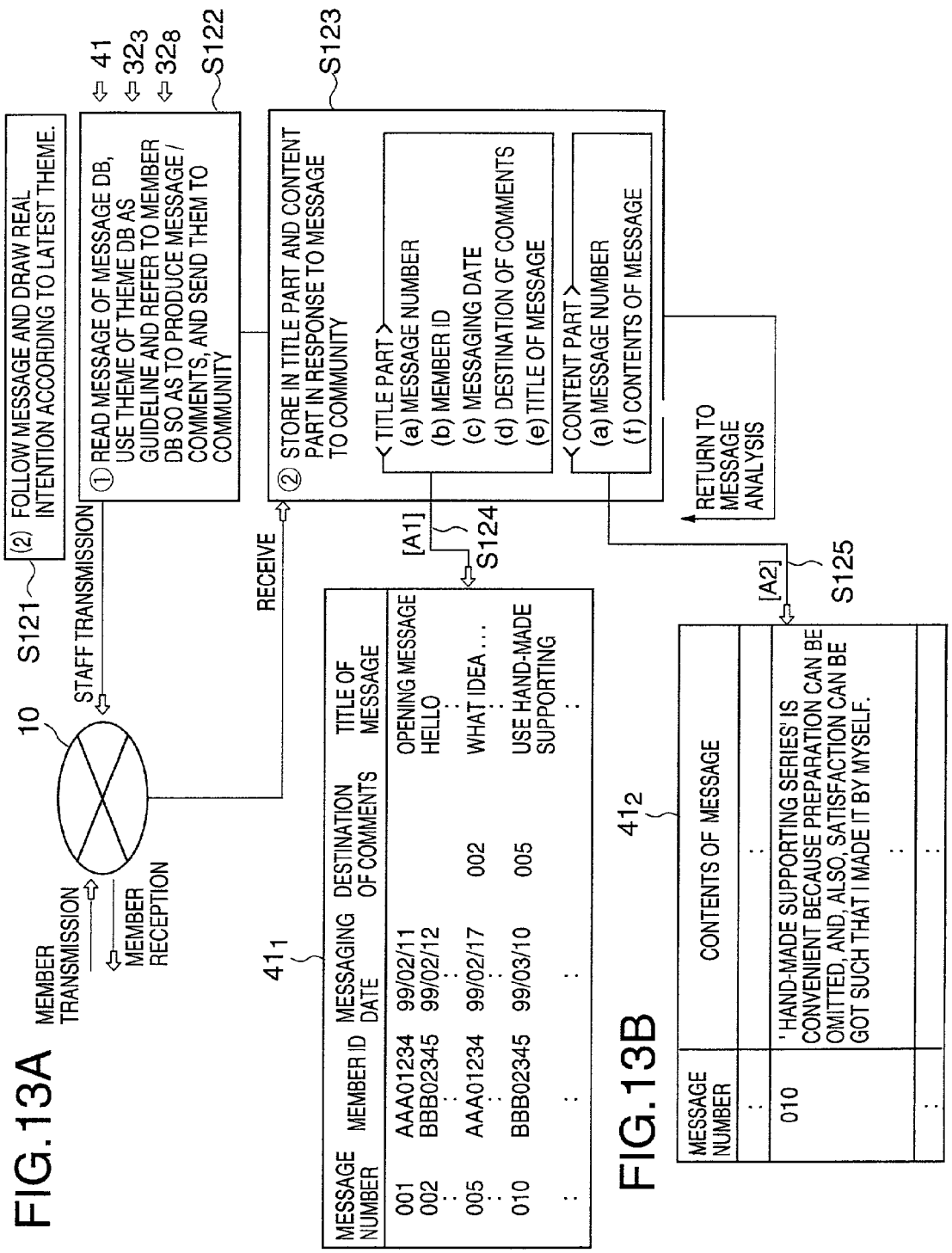

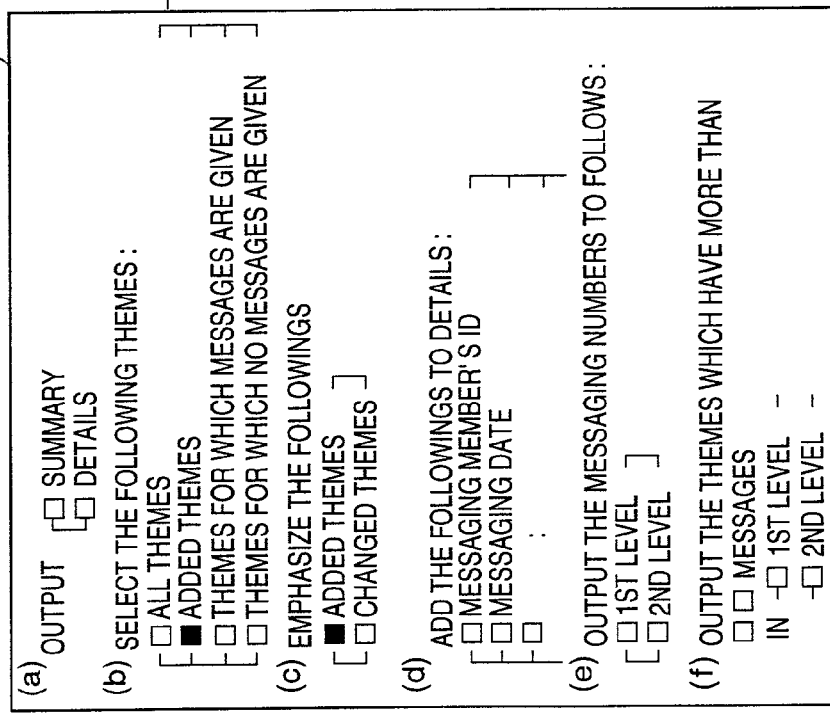

NETWORK COMMUNITY SUPPORTING METHOD AND SYSTEM

BACKGROUND OF THE INVENTION

1. Field of the Invention

The present invention relates to a network community supporting method and system, and, in particular, a network community supporting method and system suitable for extracting real intention such as characteristics, lifestyles, subconscious needs and so forth of a user class (class of users) of products/services.

2. Description of the Related Art

In order to provide better products/services, questionnaire research, group interview and so forth have been performed thereon, in the related art.

Further, recently, electronic mail system and network community (employing electronic meeting room) are used for collecting comments of the user class on specific products and so forth.

However, through questionnaire research, group interview and so forth, characteristics of users such as lifestyles thereof, subconscious needs thereof are not likely drawn out.

For example, even when questionnaire is performed in which various ideas are applied for subjects, items, and/or way of answering of the questionnaires, and so forth, the questionnaire in which a number of letters is limited for giving each inquiry has a limit by itself. Accordingly, an intention of each inquiry is not clearly understood by a respondent, or, the respondent answers merely for items of inquiry which are given. Accordingly, it is very difficult to probe into real intention of the users.

Furthermore, even when a interviewer is selected strictly, and, also, inquiry items are improved, because respondents are human beings, the respondents may go along easily with the interviewer, or make inaccurate answers as being tempted by gifts which will be given to the respondents after that. Although such respondents are not a majority, it is not possible to draw real intention of users, consequently.

Further, when an electronic bulletin board, an electronic meeting room or the like is used for collecting comments of users on specific products and so forth, a relationship between the person who collects the comments and respondents is of one-way communication, and merely formal inquiries should be sent. Accordingly, it is not possible to deepen understanding therebetween and to collect opinions of the users after that. In fact, it is difficult to make inquiry to the respondents again in view of manpower, time, and, as forth. Also, it may be difficult to make an appointment with the respondents again. Furthermore, it is difficult to collect the same respondents again and again.

Further, through collection of comments/messages using questionnaire system, electronic mails, or the like through the Internet, it is not possible to obtain subconscious needs which the respondents themselves cannot know. Thereby, it is difficult to expect the characteristics of users such as lifestyles, subconscious needs thereof.

When electronic mail system is used, and, communication is made personally, and continuously, so as to deepen the contents communicated, the following problems may occur:

① The amount for which a staff in charge can deal with is limited;

② As the contents dealt with another staff cannot be understood, a load of each individual staff cannot be effectively reduced; and ③ It is difficult to secure the number and quality of the staffs.

Further, in a case of opinion exchange is made for specific products/services using an electronic meeting room through the Internet or the like, many opinions are collected from many participants. However, the following problems occur:

As specific providers for the products are assumed, and, therefore, this meeting is not a voluntary meeting, it is difficult to expect real intention (neutral opinions) of users.

Further, because many opinions are collected from many participants, a problematic situation may occur such that the community becomes one which is separate from the original object when this community is left alone.

For example,

① The participants do not give constructive ideas, but merely exchange complaints.

② The participants do not give/exchange constructive ideas, but make arguments for determining whose opinion is correct, or merely make prattles.

③ Only some of the participants converse lively, but the others do not speak at all.

④ No messages from the participants are given.

Accordingly, it is necessary to prepare many capable persons as managing staffs for the electronic meeting.

As the opinion exchange between users becomes complicated, many staffs are needed for managing the community. Further, persons in charge of the community should be those who have various information, and, can understand any opinions without prejudice.

Further, even effective opinions are given/exchanged, there is no method of extracting characteristics of users such as lifestyles thereof, subconscious needs thereof and so forth therefrom established, yet. Accordingly, it is not possible to extract effective ideas.

SUMMARY OF THE INVENTION

The present invention has been devised in consideration of the above-mentioned problems, and, an object of the present invention is to provide a network community supporting method and system by which, by effectively utilizing such characteristics of a network community that it is possible to make communication between users bi-directionally, and information can be held by all the participants in common, it is possible to draw out voluntary messages of members, by utilizing themes which are used as common guidelines of the members, and, also, these messages are analyzed on comparison with the themes, thereby, message analysis results/theme analysis results being able to be obtained.

A network community supporting system (for example, as shown in FIG. 1) or method, according to the present invention, comprises or using:

a message database (for example, a message database 41, shown in FIG. 1) storing contents of a series of messages given by participants (persons using terminals $20_1$ through $20_n$ shown in FIG. 1, for example) of a network community together with a title part including at least message numbers, messaging dates/times, speaker identifies thereof;

a part (for example, a community supporting function part 34 in FIG. 1) analyzing characteristics of the messages concerning themes thereof based on at least one of the theme database and the above-mentioned title part and contents of the message database, and making the theme database latest.

Thereby, it is possible to provide the system and method by which characteristics of users (user class) such as lifestyles thereof, subconscious needs of users (user class) and so forth can be drawn out from the message database storing the messages of the user class.

The series of messages stored in the message database are information held in common between members. Accordingly, it is possible to hold communication between the members. Then, by this mutual stimulus, further messages of the members can be drawn out.

Further, the message database is information held in common between management staffs. Accordingly, the staffs can recognize what messages were drawn out from the members by the respective staffs mutually.

In comparison to use of an electronic mail system, it is possible to reduce the number of staffs needed for operating/managing the above-mentioned system and dealing with a large number of members. Accordingly, it is easy to secure the number and quality of management staffs.

By providing the theme classifying part and renewing/updating part, it is possible to make the information determined by the organizer of the community match the interest of the participants of the community. Accordingly, it is possible to achieve the following objects:

a) By publicizing the themes, it is possible to make participants previously know a type of the community. Accordingly, it is possible to avoid useless messages;

b) It is possible to continuously deepen the contents, in comparison to use of an questionnaire system;

c) By mutual stimulation, it is possible to deepen the contents in comparison to use of an electronic mail system;

d) The management staffs can utilize the themes as guidelines for promoting the activity; and e) By declaring the themes according to the interest of the members, it is possible to prevent merely complaints against the products/services, fighting between the members, nonsense chattering, and so forth from occurring.

The network community supporting system may further comprise:

a message analysis database (for example, the message analysis database $32_4$, shown in FIG. 2) produced based on the message database, used for analyzing the messages; and a message grouping part (for example, a grouping part $30_1$, shown in FIG. 1) appropriately grouping the messages stored in the message database, based on relationship among the messages.

The network community supporting method may further comprises the step of appropriately grouping the messages stored in the message database, based on relationship among the messages.

Thereby, by appropriately grouping the messages stored in the message database, based on relationship among the messages, it is possible to understand the flow of the discussion, and it is possible to easily perform appropriate division/correction of the titles of the messages.

The network community supporting system may further comprise:

a part (for example, a message title modifying, generating and dividing part $30_2$, shown in FIG. 1) performing modification, generation and/or division of the titles of the messages stored in the message database.

The network community supporting method may further comprises the step performing modification, generation and/or division of the titles of the messages stored in the message database.

Thereby, by performing modification, generation and/or division of the titles of the messages stored in the message database appropriately, it is possible to flexibly change the themes according to the interest of the participants, and it is possible to draw characteristics of the messages concerning the themes.

The network community supporting system may further comprise a theme database (for example, a theme database $32_3$, shown in FIG. 2) comprising a theme part storing the themes and a keyword part storing keywords concerning the themes, wherein the part drawing the real intention of the user class comprises a message theme classifying part (for example, a message theme classifying part $30_3$, shown in FIG. 1) classifying the titles of the messages into the themes, by using the keywords of the keyword part of the theme database.

The above-mentioned step may classify the titles of the messages into the themes, by using keywords concerning the themes.

Thereby, the divided/corrected titles of the messages are classified into the themes, by using the keywords of the keyword part of the theme database, and the thus-obtained titles of the messages are made match the keywords of the keyword part of the theme database. Thereby, it is possible to find out relationship therebetween, and to simply grasp the themes on discussion in relation to the themes stored in the theme database. The themes stored in the theme database are those to be used for drawing the real intention such as characteristics, lifestyles, subconscious needs of the user class on the products/services, and the organizer of the community can easily determine whether or not the community is operated according to the intention of the organizer.

By combining the grouping part and keyword part, it is possible to classify the themes by group units, and to improve the precision in classification.

It is possible to classify the themes by using not a large amount of data such as the contents of messages, but a small amount of data such as titles of messages. Accordingly, it is possible to save work needed for classification.

The network community supporting system may further comprise a theme renewing part (for example, a theme renewing part $30_4$, shown in FIG. 1) making the theme latest based on a message analysis interim output (for example, see FIG. 10), output based on the titles of the messages stored in the message database and the theme part or keyword part of the theme database.

The network community supporting method may further comprise a step making the themes latest, based on a message analysis interim output, output based on the themes or keywords concerning the theme.

Thereby, by making the themes latest, based on the message analysis results, output based on the themes or the keywords concerning the themes both stored in the theme database, the themes are made latest, and then, discussion is made/messages are given, based on the latest/optimum themes. Accordingly, the themes are made latest flexibly.

Thereby, the themes along the interest of the participants, and, as a result, themes oriented toward the users are obtained. Accordingly, it is possible to cause the themes of the user class and the request of the organizer to match one another.

It is possible that the latest themes stored in the theme database are those on which the participants currently have the interest, and information itself which the organizer (providing the community) wishes to obtain.

The network community supporting system or method may further comprise or using:

a message analysis rule database (for example, a community analysis rule database $32_7$ shown in FIG. 2) used for contriving guidelines for managing the community from the message analysis database; and a community analyzing part (for example, $30_5$, in FIG. 1) referring to the message analysis rule database, and outputting analysis results having instructions concerning management of the community added thereto.

Thereby, by referring to the community analysis rule database, grasping the situation of the activity of the community, and obtaining instructions concerning management of the community, it is possible to further promote the activity of the community effectively, and further draw messages of the participants.

The network community supporting system or method may further comprise or using:

a theme analysis rule database (for example, a theme analysis rule database $32_{10}$, shown in FIG. 2) used for analyzing the themes; and a theme analyzing part referring to the theme rule database, and performing analysis for the themes of the messages.

Thereby, it is possible to know real intention such as characteristics, lifestyles, subconscious needs or the like of the user class of the products/services.

Further, the theme analysis results can also be utilized as advertisement toward the user class. Accordingly, it is possible to increase the number of members, and, to further activate the activity, by using them.

The network community supporting system or method may further comprise or use a member database (for example, a member database $32_6$ shown in FIG. 2) storing personal information of the participants of the network community, wherein the member information of the member database is used for drawing the real intention of the user class of the products/services.

The member information of the member database storing personal information of the participants of the network community may be referred to, and messages of the user class of the products/services are drawn based thereon.

Thereby, it is possible to draw the messages of the user class according to the characteristics of the members.

According to the present invention, based on at least one of the title part and contents of the messages stored in the message database, the themes of the community are updated appropriately so that the themes become latest such as to be in accordance with the interest of the class of users on the products/services. Thereby, it is possible to obtain the lifestyles, subconscious needs, user characteristics concerning the products/services.

According to the present invention, based on at least one of the title part and contents of the messages stored in the message database, the themes of the community are updated appropriately so that the themes become latest such as to be in accordance with the interest of the class of users on the products/services. Thereby, it is possible to obtain the lifestyles, subconscious needs, user characteristics concerning the products/services.

Further, the themes can be updated dynamically, and thus, the characteristics and subconscious needs of the users can be obtained.

Further, by generating/updating the message analysis database using the message database, the flow of the messages can be easily grasped.

By using the keyword part of the theme database, and making connection between the titles of the messages of the message analysis database and the themes, it is possible to dynamically updating the themes according to change in interest of the members.

By making the object of the community provider and the interest of the members to match one another, it is possible to obtain information of the users (user class) along the object.

It is possible to obtain characteristics of user class such as lifestyles, subconscious needs, and so forth from the renewed latest themes.

Further, it is possible to obtain effective messages.

In fact, themes along the interest of the members are declared, and conversation among the members are promoted. Thereby, it is possible to prevent merely complaints against the produce/service from occurring.

By renewing the themes of activity, it is possible to prevent nonsense chattering, fighting among the members, and so forth from occurring.

By advertising the object and themes, it is possible to collect users (user class) which the organizer regards as a target, and to draw out messages along the object of the organizer. As the message database is held by the members in common, and activity between the members is promoted using the themes as guidelines therefor, it is possible to collect natural comments useful for the theme analysis.

By using the community analysis rule database, follow items for management of the community can be found out, and, thereby, further messages can be drawn out.

By also using the member database together, it is possible to perform careful/detailed analysis, and, the results can be used for further drawing messages and further theme analysis.

Further, it is possible to reduce a load borne by staffs, or the number of staffs.

In fact, by using the message database in common among the members and staffs, a load borne by each staff can be considerably reduced. In comparison to use of an electronic mail system, it is possible to easily secure required quality of the management.

By using the titles of the messages, it is possible to reduce the data amount of target information to be analyzed, and to reduce analysis work load.

Other objects and further features of the present invention will become more apparent from the following detailed description when read in conjunction with the accompanying drawings.

BRIEF DESCRIPTION OF THE DRAWINGS

FIGS. 4A and 4B illustrate publicizing to the target market according to the present invention;

FIGS. 5A and 5B illustrate promotion of theme activity according to the present invention;

FIGS. 7A, 7B, 7C, 8A, 8B, 9A, 9B, 10, 11A and 11B illustrate the analysis of messages shown in FIG. 6;

FIGS. 12A, 12B, 12C, 13A and 13B illustrate further promotion of activity;

FIGS. 14A, 14B and 14C illustrates analysis of themes according to the present invention.

DETAILED DESCRIPTION OF THE PREFERRED EMBODIMENTS

Figure 1:
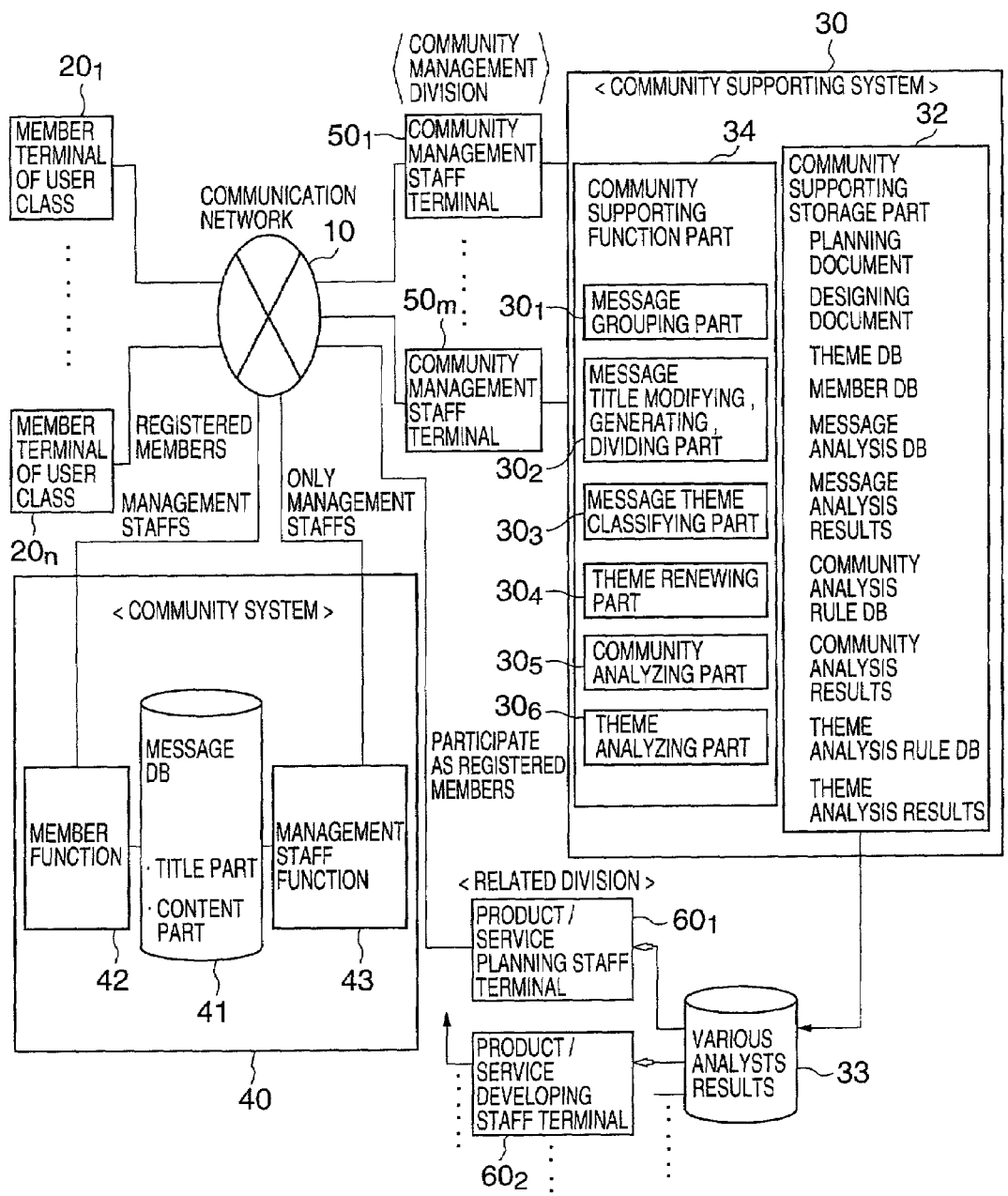
FIG. 1 shows a concept drawing of a network community supporting system in one embodiment of the present invention.

FIG. 1 shows a concept diagram of a network supporting system and method for users of products/services in an embodiment of the present invention.

The system shown in FIG. 1 includes a communication network 10, member terminals $20_1$ through $20_n$ of a user class, a community supporting system 30, a various analysis result 33 in which various analysis results are stored, a community system 40, community managing staff terminals $50_1$ through $50m$, a product/service planning staff terminal $60_1$, a product/service developing staff terminal $60_2$ and so forth. The community supporting system 30, community system 40, community managing staff terminals $50_1$ through $50m$, product/service planning staff terminal $60_1$, product/service developing staff terminal $60_2$ and so forth are shown in the figure as separate units. However, it is also possible that arbitrary terminals/systems thereof are combined together. For example, the community managing staff terminals $50_1$ through $50m$ may be included in the community supporting system 30, or the community managing staff terminals $50_1$ through $50m$ may be included in the community system 40. Further, the various analysis result 33 may be included in the community system 40.

Further, under a condition in which security is secured, the community supporting system 30 may be connected to the communication network directly.

The community supporting system 30 includes an application providing a system for drawing messages of a user class (including subconscious users) on products or the like. By this application, management/operation of a community mutually connecting the users using an electronic medium (for example, an electronic meeting room) is supported. Thus, this application is a measure to extract real intention of the user class of the products or the like.

For example, the community supporting system 30 includes a community supporting storage part 32 and a community supporting function part 34. The community supporting function part 34 includes a message grouping part $30_1$, a message title modifying, generating and dividing part $30_2$, a message theme classifying part $30_3$, a message theme renewing part $30_4$, a community analyzing part $30_5$, and a theme analyzing part $30_6$.

The message grouping part $30_1$ groups messages based on relationship between the messages. For example, grouping of messages is performed by using link relationship between the messages.

The message title modifying, generating and dividing part $30_2$ performs modification, generation and division of titles of the messages.

The message theme classifying part $30_3$ classifies the messages to the relevant themes, by using the keywords of the keyword part of the above-mentioned theme database.

The theme renewing part $30_4$ makes the themes be the latest ones based on interim outputs output based on the titles of the messages stored in the above-mentioned message database and the theme part and keyword part of the above-mentioned theme databases.

The community analyzing part $30_5$ performs analysis of the community, by referring to a community analysis rule database.

The theme analyzing part $30_6$ performs theme analysis based on a theme analysis rule database.

The community supporting storage part 32 is a storage part in which data used by the community supporting system 30, results obtained through processing by the community supporting system 30 are stored, and includes a planning document storage part, a design document storage part, the theme database, member database, a message analysis database, the message analysis rule database, a message analysis result storage part, the community analysis rule database, a community analysis result storage part, a theme analysis rule database and a theme analysis results storage part, in a separate manner.

Members of the member class previously register themselves in the community supporting system 30 through the member terminals $20_1$ through $20n$, and participate the community system 40 supported by the community supporting system 30, via the communication network 10 such as Internet. Information of the registered members is stored in the member database of the community supporting storage part 32. The members of the user class can access a message database 41 of the community system 40. However, they cannot access the community supporting system 30.

The community system 40 has the message database 41, and, provides a field in which the members can freely gives opinions or proposals. The community system 40 has the member function 42 enabling the members to give opinions or proposals and the management staff function 43 for staffs who manage/operate the community system 40.

In the message database 41, titles of messages given by the members of the user class, and the contents of the messages are stored in divided title part and content part thereof, respectively.

The community supporting system 30 updates themes to the latest ones in accordance with the interest of the members so that the members can give opinions or proposals, freely, independently.

Through the product/service planning staff terminal $60_1$, product/service developing staff terminal $60_2$ or the like, it is possible for staffs to obtain real intention of the user class on products or the like, by directly accessing the community system 40 via the communication network 10, or by accessing the theme analysis result storage part of the community supporting storage part 32 of the community supporting system 30 indirectly or directly.

The community management staffs manage the community system 40 by accessing the community system 40 and community supporting system 30 via the community management staff terminals $50_1$ through $50_m$. The community management staffs are those whom staffs participating the management acting as an organizer as being divided into those who perform planning, those who actually manage the community, those who analyze messages of the member, and so forth, are generically called.

Further, the organizer is an organizer who manages the community according to the present invention as a main part, and, it means the above-mentioned community management staffs or a CPU (not shown in the figure) which is provided in the community supporting system 30.

Figure 2:
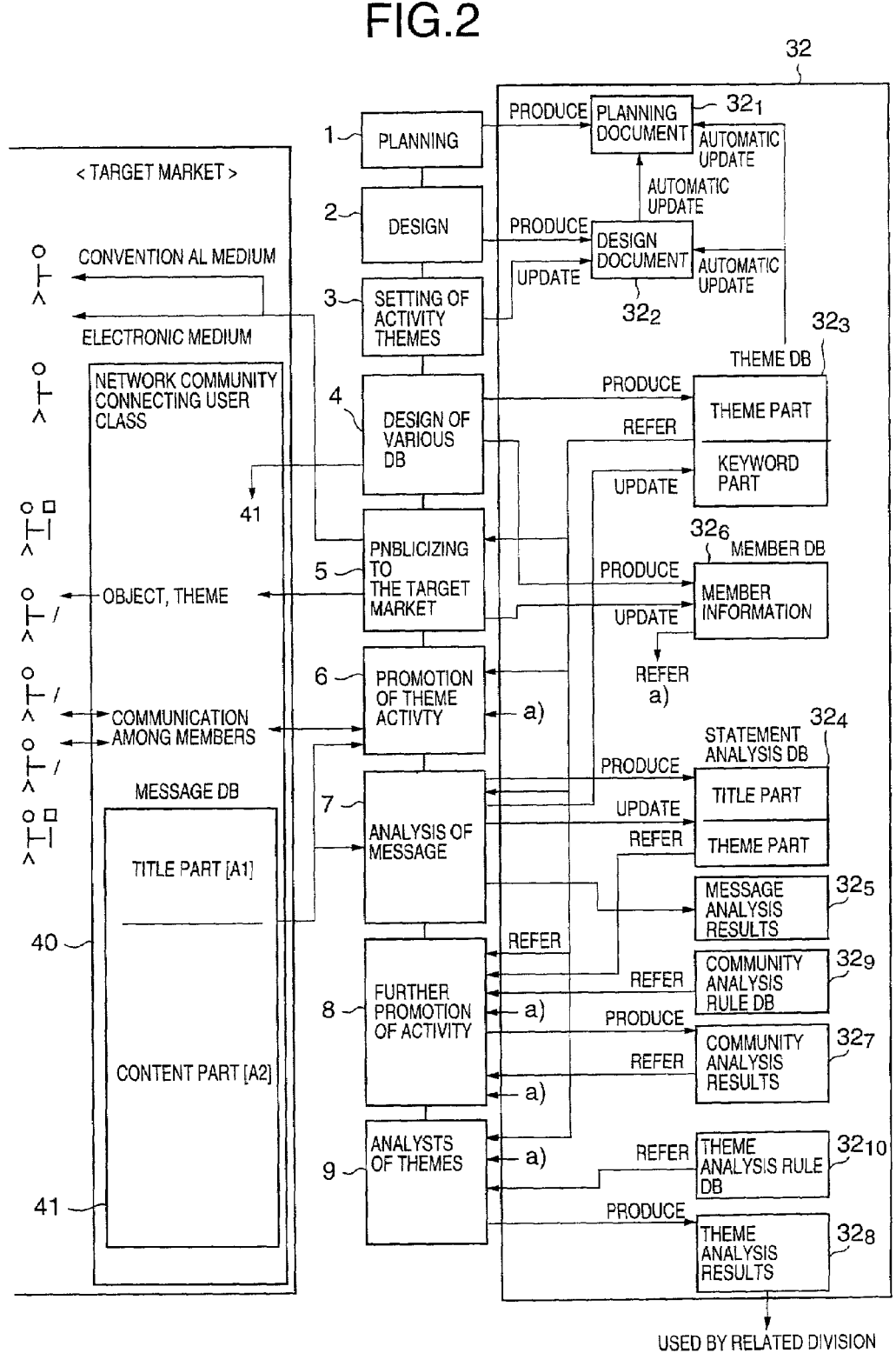
FIG. 2 illustrates a general configuration of a method of supporting a community in the embodiment of the present invention.

FIG. 2 shows a summary of a method of supporting the community in the embodiment of the present invention.

FIG. 2 shows processing 1 through 9 concerning management/operation of the community, the community system 40 and community supporting storage part 32 of the community supporting system 30. The community system 40 has the message database 41. The community supporting storage part 32 has the planning document storage part $32_1$, design document storage part $32_2$, theme database $32_3$, message analysis database $32_4$, message analysis result storage part $32_5$, member database $32_6$, community analysis result storage part $32_7$, theme analysis result storage part $32_8$, community analysis rule database $32_9$ and theme analysis rule database $32_{10}$.

The processing concerning management of the community includes planning of the community (1), design of the community (2), setting of themes (3) design of various databases (4), publicizing to the target market (5), promoting activity on themes (6), analysis of messages (7), further promoting of the activity (8), and analysis of themes (9).

First, the organizer performs planning for the community (1). Specifically, an object of an enterprise or the like for utilizing messages of the user class (class of users), and a target member class are defined. Thus, a planning document is made, and is stored in the planning document storage part $32_1$.

Then, the organizer designs the community (2). Specifically, the object of the enterprise or the like which utilizes the messages of the user class is converted into one which is as captured by the end of the user class. Thereby, the user class cannot recognize the existence of the enterprise or the like existing behind the system. Thus, the design document is made, and is stored in the design document storage part $32_2$.

Then, the organizer sets activity themes (3). Specifically, themes are set such that, therefrom, messages may be easily given by the user class who uses the products/services, along the object as seen by the user class. As the necessity arises, the design document is updated, and the updated design document is stored in the design document storage part $32_2$.

The organizer of the community performs temporarily setting of the themes of the theme database $32_3$, and design/building of various databases (4).

The theme database $32_3$ includes the theme part and keyword part. In the theme part, the themes set in the above-mentioned process (3) are stored, while, in the keyword part, keywords concerning the themes are stored. By using this theme database $32_3$, the titles of the messages of the members are classified into the corresponding themes. The theme part and keyword part are updated according to change in interest of the members.

Then, the organizer of the community publicizes to the target market, referring to the member database $32_6$ (5). Thus, the object and themes are publicized to the user class of the target market. Further, the user class is publicized to the information so as to perform exchange of opinions about the themes positively, freely.

Then, the organizer promotes the activity of the community system 40 by using an electronic medium connecting the users mutually. This community system 40 serves as a field in which the user class of the products/services give opinions/proposals (discuss) about the specific themes, positively, freely.

In order to participate the community system 40, the user class make membership registration. For the registration, the user class gives information of their addresses, names, sexes, ages, hobbies, themes for which they have interest, and so forth.

The information of the members thus registered is stored in the member database $32_6$ of the community supporting storage part 32.

The organizer of the community promotes the activity along the themes (6). The members voluntarily and positively give messages about the themes of the community. These messages are divided into titles and contents, are, then, stored into the title part A1 and content part A2 of the message database 41, respectively.

Specifically, the activity between the members is promoted, messages given there are followed, and further messages are drawn therefrom, along the themes. Promotion of the activity is performed referring to the member database $32_6$ and theme database $32_3$.

After the messages are accumulated more than a predetermined number of messages, the organizer of the community uses the message database 41, and analyses the messages (7). Specifically, the organizer performs the following processing:

① The title part A1 and content part A2 of the message database 41 are referred to, and, by using relationship, for example, link relationship between the messages, the messages are grouped and corrected appropriately. The results thereof are stored in the message analysis database $32_4$.

② The titles of the messages thus stored in the message analysis database $32_4$ are classified into the predetermined themes by using the keywords of the theme database $32_3$. Thereby, the message analysis outputs are produced.

③ Change in interest of the members is examined, and, the themes are made latest. By the thus-renewed (latest) theme, the theme database $32_3$ is updated.

Further, classification of the messages is performed by using the latest theme database $32_3$, the message analysis result storage part $32_4$ is updated. Then, the message analysis results are output.

Community analysis is performed by referring to the latest theme database $32_3$ and message analysis rule database $32_4$, and referring to the community analysis rule database $32_9$ (8). Thereby, the messages are followed. Thereby, items which should be followed (follow items) are found out. For example, a case where no response has been made to an inquiry is found out. In such a case a message may be output automatically.

Then, change in interest of the members is confirmed, and, according to the latest themes, the messages are followed, and further messages are drawn out.

When a request is given by another division in the community management organizer such that user characteristics such as lifestyles, subconscious needs thereof are wished to know, the organizer of the community performs theme analysis based on the latest theme database $32_3$ and message analysis database $32_4$ (9). At this time, the organizer refers to the theme rule database $32_9$, and, as the necessary arises, refers to the theme analysis rule database $32_{10}$.

The thus-obtained theme analysis results are stored in the theme analysis result storage part $32_8$. The real intention stored in the theme analysis result storage part $32_8$ is used through the product/service planning staff terminal $60_1$, product/service developing staff terminal $60_2$ and so forth.

Design and building of various databases will now be described with reference to FIGS. 3A, 3B and 3C.

The organizer of the community designs/builds the theme database $32_3$, member database $32_6$ and message database 40.

Figure 3A:
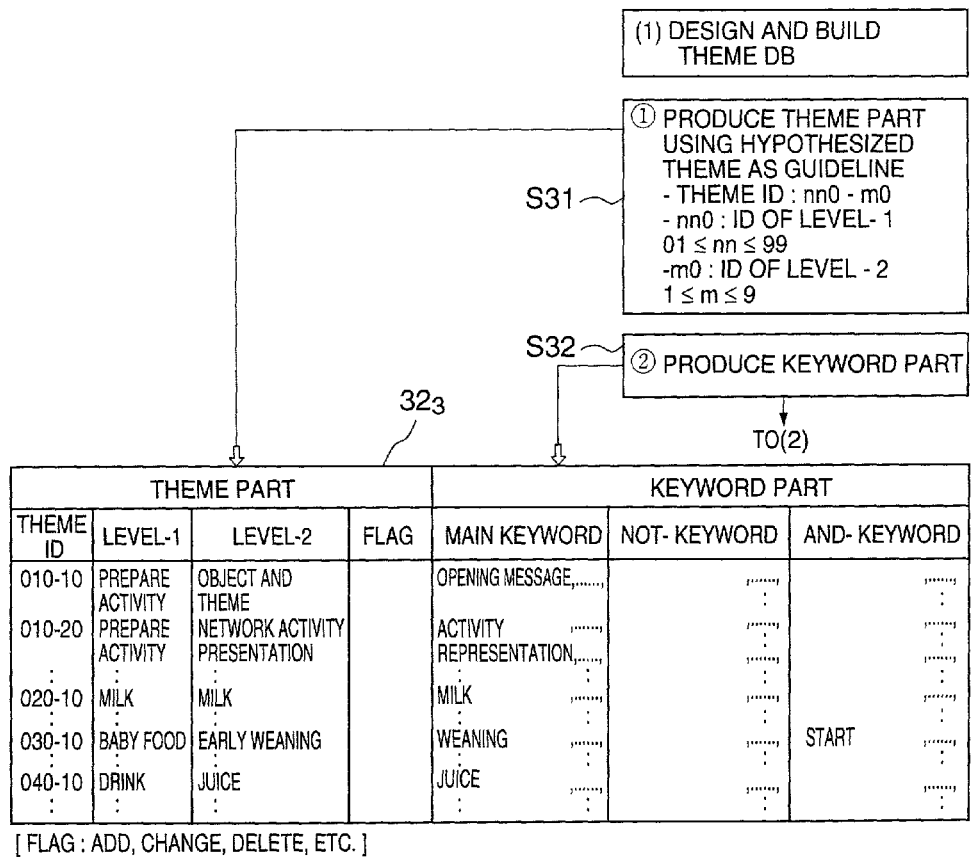
FIGS. 3A, 3B and 3C illustrate design and building of various databases according to the present invention.

FIG. 3A shows an example in which themes are temporarily set in the theme database $32_3$. The theme database $32_3$ includes the theme part and keyword part, as mentioned above.

① As the set themes set in the above-mentioned process (3) are used as guidelines, the theme part of the theme database is generated. As shown in the figure, the theme part includes a high division (level-1) and a medium division (level-2). It is also possible to classify into lower division. The themes of each level are stored in the columns of high division (level-1) and medium division (level-2). Serial numbers are given to the themes for each level as theme IDs.

② Keywords of the theme database $32_3$ are generated. A definition of each item thereof is as follows:

Main Keywords: When a main keyword exists in the title of message, the message is classified into the theme ID;

Not Keywords: When a not keyword exists in the title of message, the message is not classified; and And Keywords: When a not keyword exists in the title of message, an and keyword exists therein and, also, a main keyword exists therein, the message is classified into the theme ID.

Figure 3B:
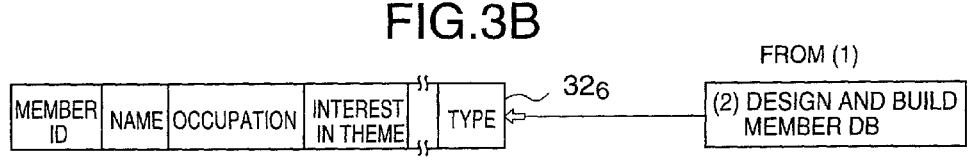

FIG. 3B shows an example of the member database $32_6$. The member database $32_6$ has member ID, name, occupation, theme for which the member has the interest, member type, and so forth, and is used for grasping the attributes and interests on the themes of the members.

Figure 3C:
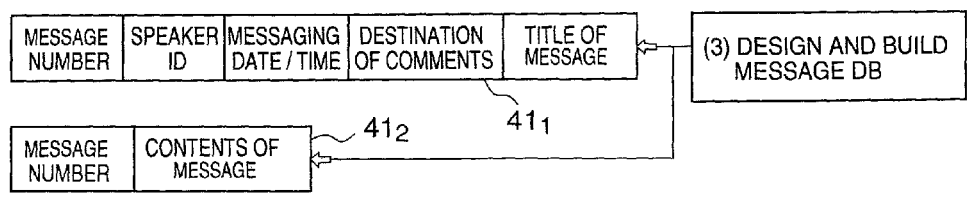

FIG. 3C shows an example of the message database 41 in which messages received from the members and management staffs are stored together with the titles in the title part thereof. The message database 41 has the title part A1 and content part A2.

The title part A1 is configured by message number, speaker ID, messaging date/time, comment destination, title of message and so forth.

The content part A2 is configured by the message number, message contents and so forth.

Publicizing to the target market will now be described with reference to FIGS. 4A and 4B.

The organizer of the community refers to the theme database $32_3$, and advertises the object and themes of the community and publicizes them to the target market so as to cause the user class thereof to participate the community. Publicizing is made internally and externally of the network community 40 (in a step S41).

A person who wishes to participate the community enters necessary matters in a network community entrance application form 42, and applies for the entrance, as shown in FIG. 4A, for example. Entering into the network community entrance application form 42 may be made via the network or made on paper.

When it is made via the network, information of the returned network community entrance application form may be stored in the member database $32_6$ as it is, as shown in FIG. 4B, for example (in a step S43) With reference to FIGS. 5A and 5B, the theme promotion activity will now be described.

The organizer of the community promotes activity along each theme (in a step S51). Specifically, along the theme, activity among the members is promoted, messages are followed, and further messages are drown from the members.

In the promotion of activity, a staff reads the messages stored in the message database 41, produces messages/comments using the themes of the theme database $32_3$ as guidelines, and sends them to the community system 40 (in a step S52).

Further, by the member function 42 of the community system 40, the title part and contents part of the message database 41 are transmitted to the terminal of a member as the request is made by the member, a title is given to each message transmitted to the network community by the terminal of a member, and is stored in the message database 41 (in a step S53).

For example, as shown in FIG. 5A, message number, speaker ID, messaging date/time, comment destination, title of message and so forth are stored in the title part A1 of the message database 41 (in a step S54). Further, for example, as shown in FIG. 5B, the message number, message contents and so forth are stored in the contents part A2 of the message database 41 (in a step S55).

After the predetermined number of messages are accumulated, the organizer of the community generates and updates the message analysis database and renews the theme database.

Figure 6:
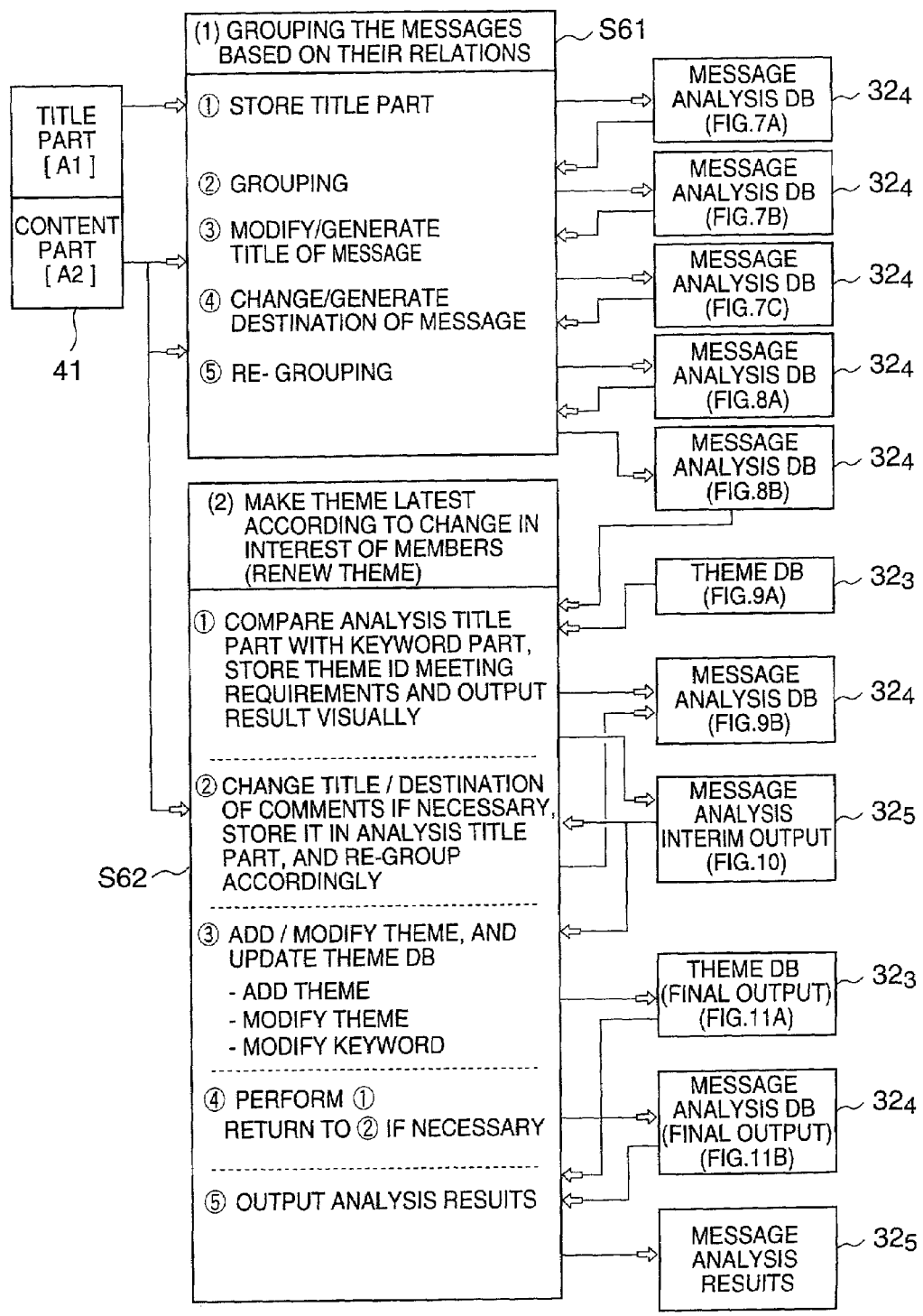
FIG. 6 shows an overall flow of processing concerning analysis of messages according to the present invention.

With reference FIG. 6, processing thereof will now be described.

The organizer uses the message database 41, and analyzes the messages.

Specifically, the community supporting system 30 performs the following two types of processing:

The title part A1 and content part A2 of the message database 41 are referred to, and, for example, by using link relationship between the messages, grouping of the titles of the messages is performed. The results thereof are stored in the message analysis database $32_4$ (in a step S61).

The analysis title part (title part for analysis) of the message analysis database and the theme database are referred to, and analysis of themes of the messages is performed. Further, according to change in interest of the members, the themes are made to be the latest ones (renewal). The latest (renewed) themes are used to update the theme database $32_3$ (in a step S62).

A part or all of the processing of the steps S61 and S62 is repeated as the necessity arises, and, thus, the accuracy of message analysis is improved. Finally, the message analysis results are output.

The contents of this processing will now be described in sequence.

(1) The title part A1 and content part A2 of the message database 41 are referred to, and, for example, by using link relationship between the messages, classification and correction thereof are performed. The classified and corrected results are stored in the message analysis database $32_4$ (in the step S61).

① The contents of the title part A1 of the message database 41 are stored in the message analysis database $32_4$.

For example, as shown in FIG. 7A, the title part A1 of the message database 41 shown in FIG. 5A is copied, and is stored in the message analysis database $32_4$ at the columns of message number, member ID, messaging date, comment destination and title of message. The message number is given in order of date/time. The member ID may be a mail address, or a name. Zero is set in the comment destination column when the message has neither parent standpoint nor child message. When the comment destination has no number, an alarm message is output, zero is set thereto, and it is regarded as a parent message.

② The respective messages are grouped according to the comment link relationship.

For example, as shown in FIG. 7B, grouping is made, and, a group ID is given to each group. The message number 001 has no link relationship, and, therefore, is of a group by itself (group ID: 001). The message numbers 002 through 004 are of messages derived from the message number 002 as a parent, and are of a group by them all (group ID: 002).

The grouping is performed as follows:

A parent message is searched for in ascending order, and, when it is found out, an arrangement is made such as a child thereof, a grand child thereof, . . .

When no child message is then found out, an arrangement is made such as a child of a message of an immediately higher rank, a ground child, . . .

When the parent is returned to, a group ID is given, and this grouping is finished.

The above-mentioned process is repeated until no input remains.

③ The titles of the messages are modified/generated as the necessity arises, and the thus-obtained ones are stored in a to-be-analyzed title part (analysis title part).

For example, as shown in FIG. 7C, as the message, numbered '002' and titled 'Hello' of the member ID: BBB02345 includes two contents, i.e., 'immediately before start of baby food' and 'relationship with milk', this message is divided. As a result, the message numbers thereof are '002' and '002-1', and, further, based on the contents of the messages, the new titles 'immediately before start of baby food' and 'relationship with milk' are produced, and, are stored in the to-be-analyzed title part.

Further, the message of the member ID: EEE05678, numbered '006' and title 'Please teach' is changed in title into 'Menu for girl's festival' according to the contents of the message. Then, this new title is stored in the to-be-analyzed title part.

Further, the message of the member ID: FFF06789, numbered '007' and titled 'Hello' is changed into 'menu for girl's festival for baby', which is stored in the to-be-analyzed title part (analysis title part).

④ The comment destination is changed/modified as the necessity arises according to the following logic, and, the thus-obtained one is stored in the to-be-analyzed title part:

i. When a divided message has a child message, the comment destination of the child message is changed according to instructions.

When instructions for changing the comment destination are given, in accordance therewith, the comment destination is changed into a message number which specifies a comment destination in the to-be-analyzed title part of the message analysis database $32_4$.

When no instructions for changing the comment destination are given, a branch number '–1' is added to the comment destination.

ii. In a case where a divided message is a child message, and, also, it is a parent message of a generation 1 in itself, the comment destination is changed into '000'.

iii. For one which is not divided, or for one which has not a link relationship originally, a link relationship is corrected/generated, when instructions are given.

For example, as shown in FIG. 8A, the comment destination of the message titled 'Hello' of the member ID: DDD04567 and numbered 004 is originally '002'. However, the message number 002 includes two different contents, and, the message 'Hello' of the member ID: DDD04567 numbered 004 thereof is a message for '002-2' divided from the original '002'. Accordingly, the comment destination is changed into '002-2', which is then stored in the to-be-analyzed title part. Similarly, 'Hello' of the member ID: CCC03456, numbered 003 is modified, and, the modified one is stored in the to-be-analyzed title part.

Further, the contents of the message 'Menu for girl's festival for baby' of the member ID: FFF06789, numbered 007 is a message for 'Menu for girl's festival' numbered 006 of the member ID: EEE05678. Accordingly, the comment destination thereof is modified into '006', which is then stored in the to-be-analyzed title part.

All or part of the contents of the message analysis database $32_4$ and message database 41 are output in a form such that they can be viewed, appropriately. As the destination device of the output, a screen of a display unit, paper printed out from a printer, a disk of hard disk drive, floppy disk drive, or the like, may be considered.

⑤ The respective messages are further grouped according to the comment link relationship.

For example, as shown in FIG. 8B, according to the modified comment link relationship, grouping is performed again.

(2) According to change in interest of the members, the themes are made to be the latest ones. By the thus-renewed latest themes, the theme database $32_3$ is updated (in a step S62).

① The to-be-analyzed (analysis) title part of the message analysis database $32_4$ such as that shown in FIG. 9B is compared with the keyword part of the theme database $32_3$ such as that shown in FIG. 9A, and, theme IDs meeting requirements are stored in the theme part of the message analysis database $32_4$. The result thereof is output in a form such that the result can be confirmed via human eyes (in a step S91).

i. Information of 'title of message' is taken for each 'message number' from the message analysis database $32_4$, and, 'theme IDs' which meet the following requirements of the theme database are stored in the column of 'theme ID' of the message analysis database $32_4$:

When any main keyword coincides with any part of the title of message, the theme ID is stored there.

When not only a main keyword but also a not keyword exist in the title of message, the theme ID is not stored there.

When both an and keyword and a main keyword exist in the title of message, the theme ID is stored there.

Higher priority is given to a not keyword than to an and keyword.

When there is no coincident keyword included in the title of message, zero is stored there.

ii. The contents of the result of the analysis of the messages (interim output) are output so as to be visually confirmed via human eyes. The destination device of the output is the display screen, printer, disk or the like.

For example, the items to be output, and the display method are specified by parameters.

When the theme ID is zero, 'others' is set in the level-1, and the title of the parent message is set in the level-2, for example.

Figure 10:
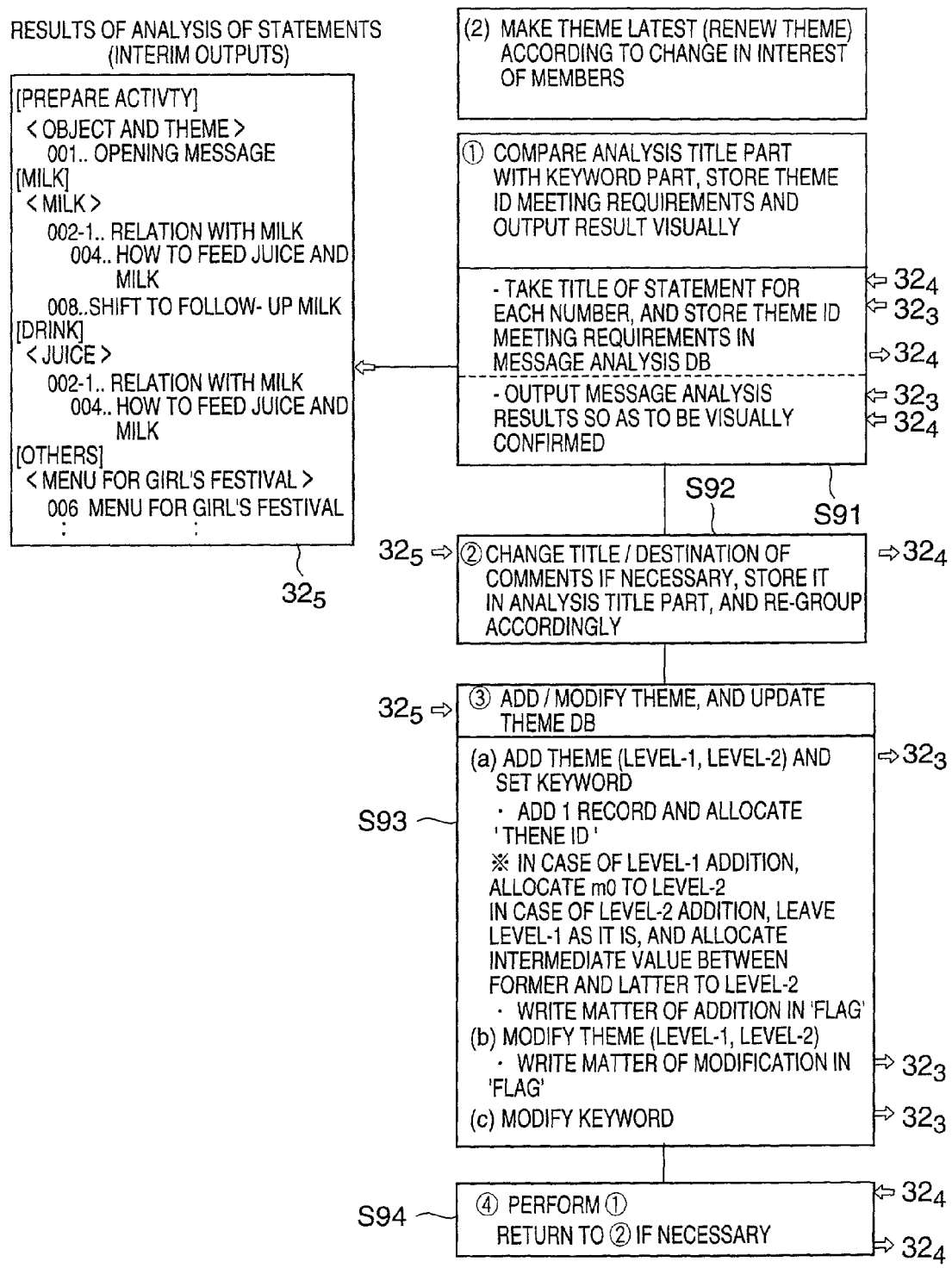

FIG. 10 shows an example of the output of the results of the analysis of the messages (interim outputs). The output items are specified by parameters.

In this example, [ ] indicates the theme in level-1, and < > indicates the theme in level-2. For the respective themes, the titles of the messages classified by these themes are arranged in a hierarchical configuration together with the message numbers so that relationship between parent and child of the link is understandable therefrom.

② When change of titles and/or modification of destinations is needed, the changed/modified contents are stored in the relevant parts of the to-be-analyzed title part (referred to as 'analysis title part', in the figures) of the message analysis database $32_4$, and, according to the thus-changed comment link relationship, grouping is performed again (in a steps S92).

③ The results of the analysis of the messages (interim outputs) are studied, and, when addition/modification of themes is needed, the theme database $32_3$ is updated (in a step S93).

The updating of the theme database $32_3$ has the following forms:

A theme (level-1, level-2) is added, and a keyword is set.

A theme (level-1, level-2) is modified.

For example, an output example of the results of the analysis of the messages (interim outputs) shown in FIG. 10 is studied, and 'event food' is added as a theme in level-1 and, 'girl's festival' is added as a theme in level-2 of the 'event food', as shown in FIG. 11A.

Further, in FIG. 11A, for the theme of 'milk', 'milk' is changed into 'powdered milk' as a theme in level-2 of 'milk', and, also, 'mother's milk' and 'follow-up milk' are added.

A keyword is modified.

Based on the above-mentioned addition and modification of themes (level-1, level-2), keywords are set for the added/modified themes.

④ The processing of the above-mentioned ① is performed. As the necessity arises, ② is returned to (step S94).

The to-be-analyzed title part of the message analysis database $32_4$ is compared with the keyword part of the modified theme database $32_4$, and the theme IDs meeting the requirements are stored in the theme part of the message analysis database $32_4$.

⑤ When modification of the theme database $32_3$ and message analysis database $32_4$ comes to be not necessary in ④, the message analysis results are output.

For example, the final results of the message analysis database $32_4$ in the analysis of the messages, as shown in FIG. 11B, are output in a form such as to be able to be confirmed visually via human eyes.

With reference to FIGS. 12A, 12B and 13, further promotion of the activity will now be described.

For example, the community analysis rule database $32_9$ is used, and the community analysis results $32_7$ (final outputs) shown in FIG. 12C are output.

The community t analysis results $32_7$ (final outputs) have, according to the rule, a follow-instruction message added thereto. According to the analysis rule, information of the member database $32_6$ may be referred to.

As shown in FIG. 12A, the community analysis rule database $32_9$ includes conditions and output messages.

For example, a rule 1 thereof is a rule for a case where, when 'a tree of a comment link is terminated by comments by a member at the end', 'isn't it necessary to follow the message?' is output.

According to the rule 1, as shown in FIG. 12C, with regard to 'event food', 'isn't it necessary to follow the message?' is output to the column of follow-instruction message of the community analysis results $32_7$ (final output).

Then, in a step S121 in FIG. 13A, the organizer of the community follows the message, according to the latest theme, and draws further messages from the member class.

In the further promotion of the activity, a staff reads the messages in the message database 41, and, using the community analysis results $32_7$ (final outputs) shown in FIG. 12C as guideline, produces messages/comments, similarly to the promotion of the activity shown in FIG. 5, which are then sent to the community system 40 (in a step S122).

Further, by the member function 42 of the community system 40, similar to the promotion of the activity shown in FIG. 5, the title part and content part of the message database 41 are transmitted to the terminal of a member in response to the request from the member, and, in response to messages in the network community 40 transmitted from the terminal of a member, stores the contents thereof in the message database 41 together with the title thereof (in a step S123).

Similar to the promotion of the activity shown in FIG. 5, the message number, speaker ID, messaging date/time, comment destination, title of message, and so forth are stored in the title part A1 of the message database 41 (in a step 124). Further, the message number, contents of message and so forth are stored in the content part A2 of the message database 41 (in a step 125).

With reference to FIG. 14, analysis of the real intention of the user class will now be described.

Based on the contents of the message analysis database $32_4$, user characteristics such as life styles, subconscious needs and so forth of the user class, needed for activity of the enterprise or the like are found out (in a step S131).

According to the theme analysis rule database $32_{10}$, the theme analysis results $32_8$ are output, as shown in FIG. 14B, for example (in a step S132).

FIG. 14A shows an example of the theme analysis rule. In this example, according to this rule, the following matters are determined:

(a) whether output is made in summary or in detail; (b) a range of selecting themes; (c) which matters are emphasized in the output; (d) which items are output in the output in detail; (e) whether the number of themes in level-1 or level-2 is output; (f) whether a theme ID for which the number of message in level-1 or level-2 is more than a predetermined number is output; and so forth.

FIG. 14B shows an example of an output of theme analysis results for added themes in the output in detail.

A possible form of the present invention is 'a method in which the user class of products/services gives messages for specific themes, the contents of the series of the messages of the user class are stored together with titles thereof, the themes are updated appropriately based on the titles of the thus-stored messages, the contents of the messages of the user class are analyzed, and, thereby, user characteristics such as lifestyles, subconscious needs and so forth are drawn out therefrom'.

Figure 15:
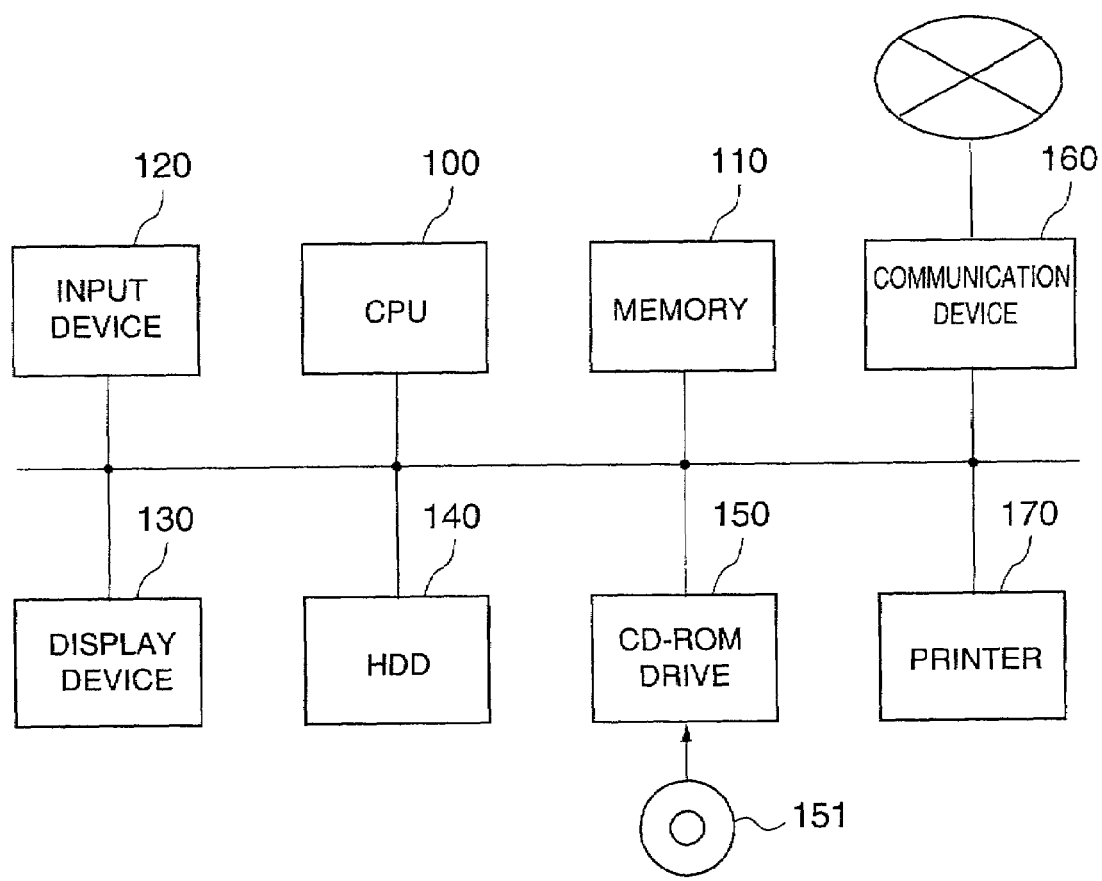
FIG. 15 shows a general configuration of a personal computer to which the present invention can be applied.

FIG. 15 shows a general-purpose computer to which the present invention can be applied.

The computer shown in FIG. 15 includes a CPU 100 performing processing/operation according to the present invention described above by executing instructions written in a software program, which is originally recorded in a carriable recording medium such as a CD-ROM 151, is read therefrom through a CD-ROM drive 150, is written into a hard-disk drive 140, then is read by the CPU 100.

This computer can communicate with other terminals of the users/members of the network community, via the network such as Internet through an appropriate communication device 160. The organizer/staff of the community can input various information such as the themes, keywords, and so forth to the HDD 140 through an input device 120 such as a mouse, keyboard, and so forth, and draw various information such as real intention of the user class of specific products/services from the HDD 140 through a display device 130 or a printer 170. The HDD is used for storing the various databases mentioned above of the present invention.

The present invention is not limited to the above-described embodiment, and variations and modifications may be made without departing from the scope of the present invention.

The present application is based on Japanese priority applications No. 2000-099377, filed on Mar. 31, 2000, the entire contents of which are hereby incorporated by reference.

What is claimed is:

1. A network community supporting system comprising:
a message database storing contents of messages given by participants of a network community together with titles thereof;
a theme database storing themes of the network community;
a theme classifying part analyzing characteristics of the messages concerning themes thereof, based on the contents stored in said message database and theme database;
a theme updating part updating said theme database based on the analysis results of said theme classifying part;
a message analysis database for analyzing the messages generated based on said message database;
a message grouping part appropriately grouping the messages stored in said message database, based on relationship among the messages stored in said message analysis database or message database; and
a part performing modification, generation and/or division of the titles of the messages stored in said message analysis database.

2. The network community supporting system as claimed in claim 1, further comprising:
a theme database comprising a theme part storing the themes and a keyword part storing keywords concerning the themes, wherein said theme classifying part classifies the modified, generated and/or divided titles of the messages, by using the keywords of said keyword part of said theme database.

3. The network community supporting system as claimed in claim 1, further comprising:
a theme renewing part updating the themes based on a message analysis interim output, output based on the titles of the messages stored in said message analysis database and a theme part storing the themes or a keyword part storing keywords concerning the themes of a theme database.

4. The network community supporting system as claimed in claim 1, further comprising:
a community analysis rule database used for contriving guideline for management of the community from the contents of said message analysis database analyzing the contents of the messages; and
a community analyzing part referring to said community analysis rule database, and analyzing the community.

5. The network community supporting system as claimed in claim 1, further comprising:
a theme analysis rule database used for analyzing the themes from said message analysis database; and
a theme analyzing part referring to said theme rule database, and analyzing the theme.

6. The network community supporting system as claimed in claim 1, further comprising:
a member database storing personal information of the participants of the network community, wherein the member information of said member database is used for drawing the messages of the participants.

7. A network community supporting method, comprising:
preparing a message database storing contents of a series of messages given by participants of a network community together with titles thereof;
preparing a theme database storing themes of the network community;
analyzing characteristics of the messages concerning themes thereof, based on the contents stored in said message database and theme database; and
updating said theme database based on the analysis results of said theme classifying part;
preparing a message analysis database for analyzing the messages generated based on said message database;
appropriately grouping the messages stored in said message database, based on relationship among the messages stored in said message analysis database or message database; and
performing modification, generation and/or division of the titles of the messages stored in said message analysis database.

8. The network community supporting method as claimed in claim 7, further comprising:
preparing a theme database comprising a theme part storing the themes and a keyword part storing keywords concerning the themes, wherein said analyzing classifies the modified, generated and/or divided titles of the messages, by using the keywords of said keyword part of said theme database.

9. The network community supporting method as claimed in claim 7, further comprising:
updating the themes based on a message analysis interim output, output based on the titles of the messages stored in said message analysis database and a theme part storing the themes or a keyword part storing keywords concerning the themes of a theme database.

10. The network community supporting method as claimed in claim 7, further comprising:
preparing a community analysis rule database used for contriving guideline for management of the community from the contents of said message analysis database analyzing the contents of the messages; and
referring to said community analysis rule database, and analyzing the community.

11. The network community supporting method as claimed in claim 7, further comprising:
preparing a theme analysis rule database used for analyzing the themes from said message analysis database; and
referring to said theme rule database, and analyzing the theme.

12. The network community supporting method as claimed in claim 7, further comprising:
preparing a member database storing personal information of the participants of the network community, wherein the member information of said member database is used for drawing the messages of the participants.

* * * * *